(12) United States Patent
Cho et al.

(10) Patent No.: US 9,327,614 B2
(45) Date of Patent: May 3, 2016

(54) SYSTEM AND METHOD OF CONTROLLING MOTOR FOR REDUCING VIBRATION OF ELECTRIC VEHICLE

(71) Applicants: Hyundai Motor Company, Seoul (KR); Kia Motors Corporation, Seoul (KR)

(72) Inventors: Woocheol Cho, Daejeon (KR); Deokkeun Shin, Gyeonggi-do (KR); Jincheol Shin, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/549,588

(22) Filed: Nov. 21, 2014

(65) Prior Publication Data

US 2016/0082862 A1 Mar. 24, 2016

(30) Foreign Application Priority Data

Sep. 22, 2014 (KR) .......................... 10-2014-0126193

(51) Int. Cl.
*B60L 15/20* (2006.01)
*B60W 20/00* (2016.01)

(52) U.S. Cl.
CPC ................ *B60L 15/20* (2013.01); *B60W 20/00* (2013.01); *B60W 2540/10* (2013.01); *B60W 2710/083* (2013.01); *Y10S 903/906* (2013.01)

(58) Field of Classification Search
CPC ... B60L 15/20; B60W 20/00; B60W 2540/10; B60W 2710/083; Y10S 903/906
See application file for complete search history.

(56) References Cited

U.S. PATENT DOCUMENTS 4,976,239 A * 12/1990 Hosaka ................. F02D 11/106 123/399
6,232,733 B1 5/2001 Obayashi et al.
6,441,506 B2 * 8/2002 Nakashima ............ B60K 6/365 123/179.1
8,590,651 B2 * 11/2013 Shigematsu ........... B60K 13/02 180/68.1
2001/0020789 A1 9/2001 Nakashima
2004/0000887 A1 1/2004 Lim
2010/0082189 A1 * 4/2010 Xu ......................... B60L 15/20 701/22
2010/0207559 A1 * 8/2010 Imai ....................... B60K 6/365 318/400.23
2011/0112709 A1 * 5/2011 Park ....................... B60K 6/448 701/22

FOREIGN PATENT DOCUMENTS

| JP | 3690978 B2 | 8/2005 |
|---|---|---|
| JP | 2009-106099 A | 5/2009 |
| JP | 2009-247157 A | 10/2009 |
| JP | 2011-219008 A | 11/2011 |
| JP | 2012-214179 A | 11/2012 |
| KR | 10-2011-0049934 | 5/2011 |

* cited by examiner

*Primary Examiner* — Michael J Zanelli
(74) *Attorney, Agent, or Firm* — Mintz Levin Cohn Ferris Glovsky and Popeo, P.C.; Peter F. Corless

(57) ABSTRACT

A system and a method of controlling a motor for reducing vibration of an electric vehicle are provided that maximize an output torque of the motor by applying a vibration reduction torque gain based on a position value of the accelerator pedal. The system includes a driving motor as a power source and an accelerator pedal position sensor configured to detect a position value of an accelerator pedal. In addition, a controller is configured to calculate a virtual position value of the accelerator pedal limited to an increasing slope or a descending slope based on the position value of the accelerator pedal, and output a final torque of the driving motor by applying a vibration reduction torque gain based on the virtual position value of the accelerator pedal.

12 Claims, 3 Drawing Sheets

SYSTEM AND METHOD OF CONTROLLING MOTOR FOR REDUCING VIBRATION OF ELECTRIC VEHICLE

CROSS-REFERENCE TO RELATED APPLICATION

This application claims priority to and the benefit of Korean Patent Application No. 10-2014-0126193 filed in the Korean Intellectual Property Office on Sep. 22, 2014, the entire contents of which are incorporated herein by reference.

BACKGROUND (a) Field of the Invention

The present invention relates to a system and a method of controlling a motor for reducing vibration of an electric vehicle. More particularly, the present invention relates to a system and a method of controlling a motor for reducing vibration of an electric vehicle that maximizes an output torque of the motor by applying a vibration reduction torque gain based on a position value of the accelerator pedal.

(b) Description of the Related Art

Generally, environmentally-friendly vehicles such as an electric vehicle, a fuel cell vehicle, and a hybrid electric vehicle are operated by a driving motor which generates torque using electrical energy. The electric vehicle uses power of the driving motor operated by power of a battery. The hybrid electric vehicle uses power of an internal combustion engine and power of the driving motor. The electric vehicles using the driving motor do not have a damping element between the motor and a driving shaft, thus causing vibration to be generated by the torque of the motor. In the electric vehicle, since the damping element is omitted, vibration such as shock and jerk as well as vibration of a driving shaft occur during shifting and tip-in/out (e.g., operation of pressing or separating accelerator pedal, that is, engaging and disengaging the accelerator pedal) occur which results in deterioration of ride comfort and drivability.

Accordingly, the electric vehicle including the driving motor may use a vibration reduction (anti-jerk) logic to reduce vibration of the vehicle. The vibration reduction logic recognizes a deviation (difference) between model speed and actual speed of the motor as vibration, and multiples the deviation between the two speeds by a predetermined value to obtain a result, and feedbacks the result to suppress the vibration. In other words, vibration is reduced by applying a positive torque or a negative torque based on a currently generated torque according to vibration of the motor. However, when the vibration reduction logic is applied even though a driver requests a maximum torque of the motor, an output torque of the motor adding the negative torque is less than the maximum torque of the motor. Thus, power performance of the vehicle may be deteriorated.

The above information disclosed in this section is merely for enhancement of understanding of the background of the invention and therefore it may contain information that does not form the prior art that is already known in this country to a person of ordinary skill in the art.

SUMMARY

The present invention provides a system and a method of controlling a motor for reducing vibration of an electric vehicle having advantages of maximizing an output torque of the motor by applying a vibration reduction torque gain based on a position value of the accelerator pedal.

An exemplary embodiment of the present invention provides a system of controlling a motor for reducing vibration of an electric vehicle that may include a driving motor that operates as a power source; a accelerator pedal position sensor configured to detect a position value of an accelerator pedal; and a controller configured to calculate a virtual position value of the accelerator pedal limited to an increasing slope or a descending slope based on the position value of the accelerator pedal, and output a final torque of the driving motor by applying a vibration reduction torque gain based on the virtual position value of the accelerator pedal.

The controller may further be configured to output the final torque based on a maximum output torque of the driving motor and a vibration reduction torque to which applied the vibration reduction torque gain. The controller may be configured to calculate the virtual position value of the accelerator pedal using a high pass filter or a low pass filter. The controller may also be configured to set the vibration reduction torque gain to a maximum value when the position value of the accelerator pedal is about 0%. The controller may be configured to set the vibration reduction torque gain to a minimum value when the position value of the accelerator pedal is about 100%.

Another exemplary embodiment of the present invention provides a method of controlling a motor for reducing vibration of an electric vehicle that may include detecting, by a controller, a position value of an accelerator pedal using a position sensor; calculating, by the controller, a virtual position value of the accelerator pedal limited to an increasing slope or a descending slope based on the position value of the accelerator pedal; applying, by the controller, a vibration reduction torque gain based on the virtual position value of the accelerator pedal; and outputting, by the controller, a final torque of a driving motor.

The final torque of the driving motor may be calculated based on a maximum output torque of the driving motor and a vibration reduction torque to which applied the vibration reduction torque gain. The virtual position value of the accelerator pedal may be calculated using a high pass filter or a low pass filter. The vibration reduction torque gain may be set to a maximum value when the position value of the accelerator pedal is about 0%. In addition, the vibration reduction torque gain may be set to a minimum value when the position value of the accelerator pedal is about 100%.

As described above, according to an exemplary embodiment of the present invention, a shortage phenomenon of output of the driving motor may be prevented by reducing vibration of the motor even when the driver requests a maximum output torque of the driving motor. In addition, drivability and ride comfort of the electric vehicle during accelerating may be improved by maintaining power performance of the driving motor.

BRIEF DESCRIPTION OF THE DRAWINGS

The attached drawings illustrate exemplary embodiments of the present invention, provided for describing the present invention in more detail, but not for limiting technical aspects of the present invention.

DETAILED DESCRIPTION

Figure 1:
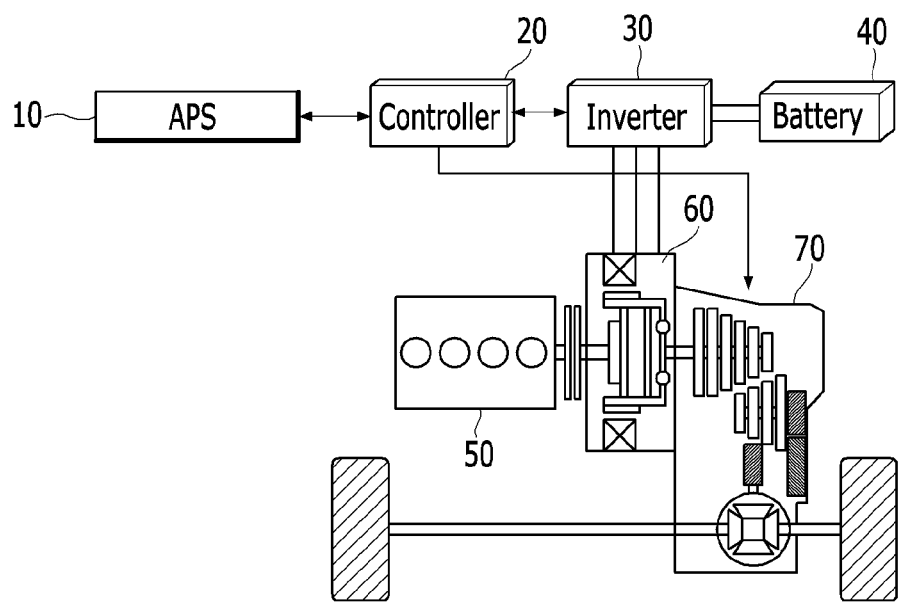
FIG. 1 is an exemplary block diagram of a system of controlling a motor for reducing vibration of an electric vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, exemplary embodiments of the present invention have been shown and described, simply by way of illustration. As those skilled in the art would realize, the described exemplary embodiments may be modified in various different ways, all without departing from the spirit or scope of the present invention. Like reference numerals designate like constituent elements throughout the specification.

In the present specification and the claims, it shall be appreciated that an electric vehicle includes vehicles using electricity as a power source, such as a plug in hybrid electric vehicle (PHEV) or hybrid electric vehicle (HEV) using electricity as a part of a power source, as well as an electric vehicle (EV) using electricity as the entirety of a power source. An exemplary embodiment of the present invention will hereinafter be described in detail with reference to the accompanying drawings.

FIG. 1 is an exemplary block diagram of a system of controlling a motor for reducing vibration of an electric vehicle according to an exemplary embodiment of the present invention. As shown in FIG. 1, a system of controlling a motor for reducing vibration of an electric vehicle an exemplary embodiment of the present invention may include an accelerator pedal position sensor 10, a controller 20, an inverter 30, a battery 40, an engine 50, a driving motor 60 and a transmission 70.

The accelerator pedal position sensor (APS) 10 may be configured to continuously detect a position value of an accelerator pedal and transmit a monitoring signal to the controller 20. The position value of the accelerator pedal may be about 100% when the accelerator pedal is pressed fully (e.g., fully engaged), and the position value of the accelerator pedal may be about 0% when the accelerator pedal is disengaged. When the position value of the accelerator pedal is greater than about 0%, the controller 20 may be configured to determine that the driver intends to accelerate, and calculate a demand torque of the driver. Additionally, when the position value of the accelerator pedal is about 0%, the controller 20 may be configured to determine that a minimum demand torque of the driver is a creep torque which is a minimum torque based on creep driving of the vehicle.

A throttle valve position sensor (TPS) mounted on an intake pipe may be used instead of the accelerator pedal position sensor 10. Therefore, in this specification and the scope of the appended claims, the accelerator pedal position sensor 10 may include the throttle valve position sensor, and the position value of the accelerator pedal should be understood to be an opening value of the throttle valve.

Furthermore, the inverter 30 may be configured to drive or operate the driving motor 60 by converting a direct-current (DC) voltage supplied from the battery 40 into a three-phase alternating voltage in response to a control signal from the controller 20. The inverter 30 may be composed of a plurality of power switching elements and the power switching elements of the inverter 30 may each be implemented by any one of an IGBT (insulated gate bipolar transistor), a MOSFET, a transistor, and a relay.

The battery 40 may be formed with a plurality of unit cells, and a high voltage for providing a driving voltage to the driving motor 60 may be stored in the battery 40. The battery 40 may be operated by a battery management system (not shown) according to a charging state, and may be prevented from overcharging under a critical voltage or over a critical voltage. The engine 50 mounted within a hybrid electric vehicle may be configured to output power as a power source while turning on based on a control signal from the controller 20. The driving motor 60 may be operated by a three-phase alternating current (AC) voltage applied from the inverter 30 to generate torque, and may operate as a power generator and supply regenerative energy to the battery 40 during coasting.

The transmission 70 may be configured to adjust a shift ratio by operating engagement elements and disengagement elements, using hydraulic pressure according to a control signal from the controller 20. When the engine 50 is mounted within the electric vehicle, the engine clutch (not shown) may be disposed between the engine 50 and the driving motor 60 to provide an EV mode and an HEV mode. The controller 20 may be configured to calculate a virtual position value of the accelerator pedal limited to an increasing slope or a descending slope based on the position value of the accelerator pedal detected by the accelerator pedal position sensor 10. The controller 20 may use a high pass filter or a low pass filter to calculate the virtual position value of the accelerator pedal.

In addition, the controller 20 may be configured to calculate a vibration reduction torque gain based on the virtual position value of the accelerator pedal, and output a final torque of the driving motor 60 to which applied the vibration reduction torque gain. The controller 20 may be configured to calculate the final torque of the driving motor 60 based on a maximum output torque of the driving motor 60 and a vibration reduction torque to which applied the vibration reduction torque gain. Herein, the vibration reduction torque gain may be set to a maximum value when the position value of the accelerator pedal is about 0%, and may be set to a minimum value when the position value of the accelerator pedal is about 100%. Accordingly, the controller 20 may be implemented as at least one processor operated by a predetermined program, and the predetermined program may be programmed to perform each step of a method for controlling a motor for reducing vibration of an electric vehicle according to an exemplary embodiment of the present invention.

Figure 2:
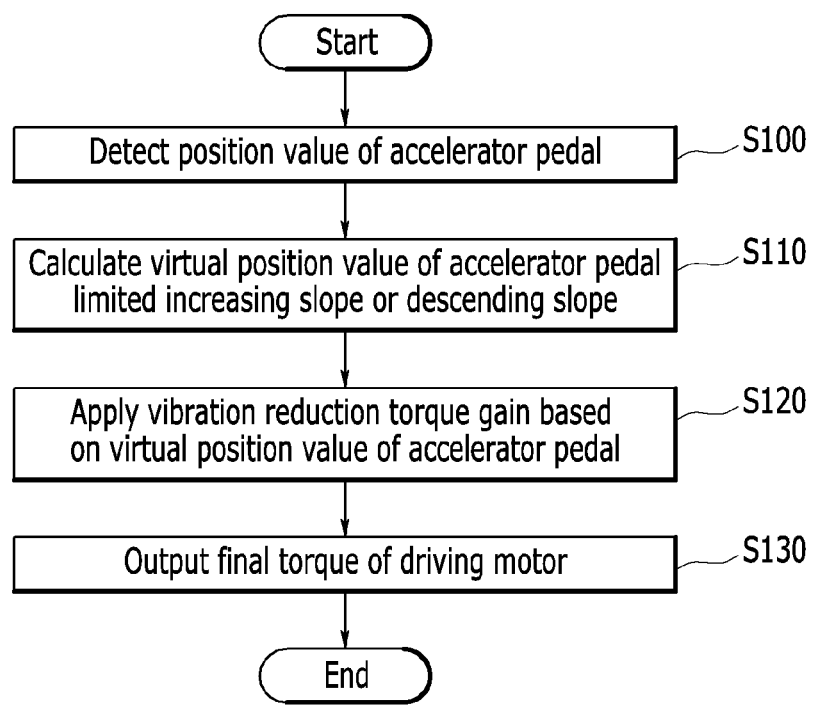
FIG. 2 is an exemplary flowchart showing a method of controlling a motor for reducing vibration of an electric vehicle according to an exemplary embodiment of the present invention.

Hereinafter, a method of controlling a motor for reducing vibration of an electric vehicle according to an exemplary embodiment of the present invention will be described in detail with reference to the accompanying drawings. FIG. 2 is an exemplary flowchart showing a method of controlling a motor for reducing vibration of an electric vehicle according to an exemplary embodiment of the present invention. As shown in FIG. 2, a method of controlling a motor for reducing vibration of an electric vehicle according to an exemplary embodiment of the present invention may begin with detecting a position value of an accelerator pedal at step S100.

As described above, when the position value of the accelerator pedal detected by the accelerator pedal position sensor 10 is greater than about 0%, the controller 20 may be configured to determine that the driver intends to accelerate (e.g., an acceleration intention). Additionally, when the position value of the accelerator pedal is about 0%, the controller may be configured to determine that the driver does not intend to accelerate (e.g., a non-acceleration intention), thus requiring the creep torque which is a minimum torque based on a vehicle speed. Therefore, the driving motor 60 may be preventing from outputting a demand torque of the driving motor and the controller 20 may be configured to reduce vibration substantially by using the vibration reduction torque. Accordingly, when the position value of the accelerator pedal is about 0%, the vibration reduction torque gain may be set to a maximum value (e.g., 1).

Furthermore, when the position value of the accelerator pedal is greater than about 0%, the driving motor 60 may be configured to output the motor torque. Particularly, when the position value of the accelerator pedal is about 100%, a maximum output torque of the driving motor may be demanded. Thus, the vibration reduction torque may be omitted. Accordingly, when the position value of the accelerator pedal is about 100%, the vibration reduction torque gain may be set to a minimum value (e.g., 0). When the position value of the accelerator pedal is detected at the step S100, the controller 20 may be configured to calculate a virtual position value of the accelerator pedal limited to an increasing slope or a descending slope based on the position value of the accelerator pedal at step S110.

The increasing slope or the descending slope of the position value of the accelerator pedal may be rapidly changed when the driver tips in/out on the accelerator pedal (e.g., when the pressure on the accelerator changes). Accordingly, the vibration reduction torque gain may change due to the change of the increasing slope or the descending slope, and thus the controller 20 may be configured to limit the increasing slope or the descending slope to calculate the virtual position value of the accelerator pedal. When the virtual position value of the accelerator pedal is calculated at the step S110, the controller 20 may be configured to apply a vibration reduction torque gain based on the virtual position value of the accelerator pedal at step S120. The vibration reduction torque gain may be set as a value from about 0 to 1. After that, the controller 20 may be configured to output a final torque of the driving motor 60 to which applied the vibration reduction torque gain at step S130. The final torque of the driving motor 60 may be calculated based on a maximum output torque of the driving motor 60 and a vibration reduction torque to which applied the vibration reduction torque gain.

Figure 3:
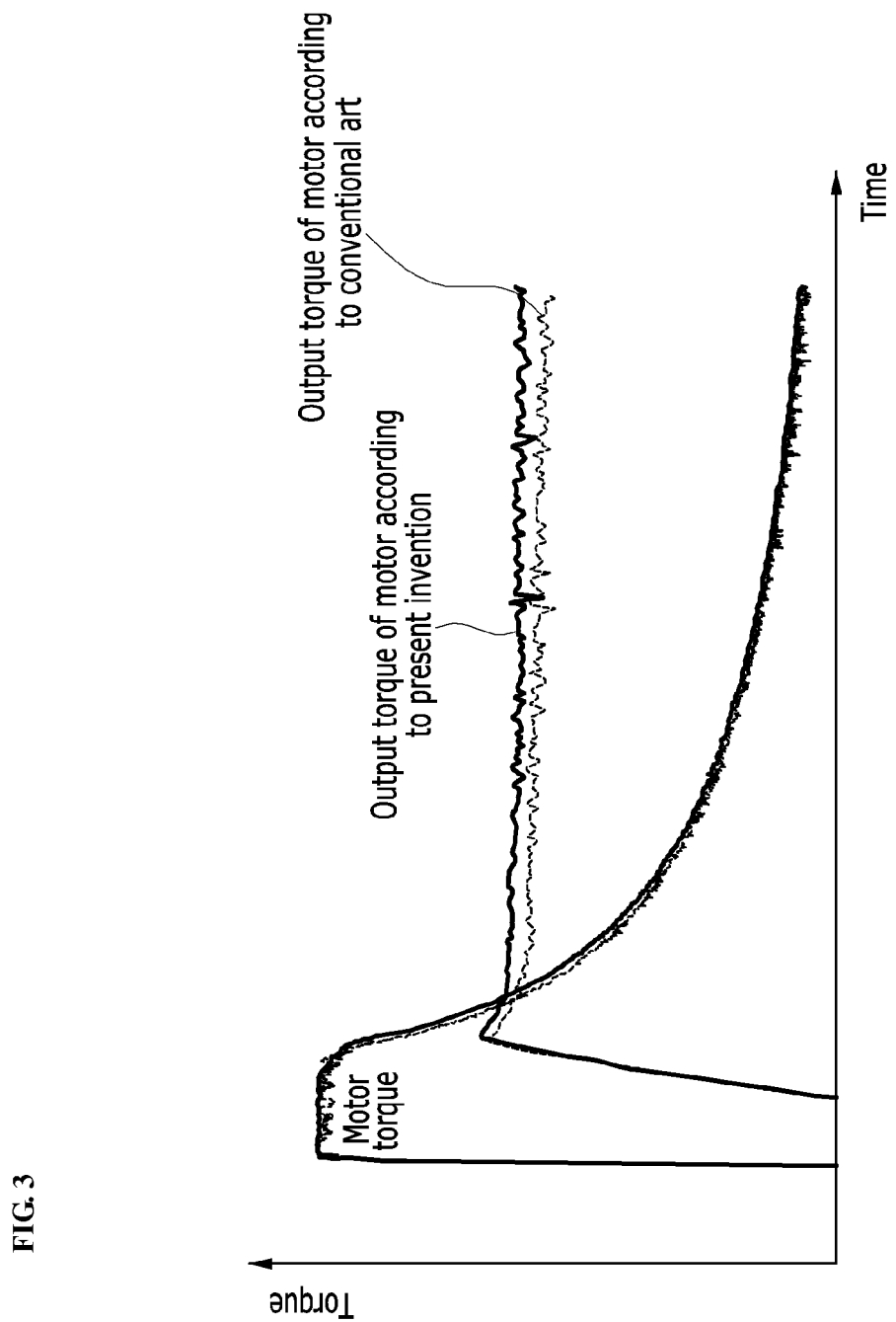
FIG. 3 is an exemplary graph showing a comparison result between an output torque of a motor according to a related art and an output torque of a motor according to an exemplary embodiment of the present invention.

FIG. 3 is an exemplary graph showing a comparison result between an output torque of a motor according to a related art and an output torque of a motor according to an exemplary embodiment of the present invention. As shown in FIG. 3, a motor torque may be decreased from a maximum value as a motor output increases when the driver requests a maximum output torque of the motor. Herein, the output torque of the motor according to an exemplary embodiment of the present invention may be greater than the output torque of the motor according to a related art.

As described above, according to an exemplary embodiment of the present invention, a shortage phenomenon of output of the driving motor may be prevented by reducing vibration of the motor even when the driver requests a maximum output torque of the driving motor.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

Description of symbols
- 10: accelerator pedal position sensor
- 20: controller
- 30: inverter
- 40: battery
- 50: engine
- 60: driving motor
- 70: transmission

What is claimed is:

1. A system of controlling a motor for reducing vibration of an electric vehicle, comprising:
    a driving motor configured to operate as a power source;
    an accelerator pedal position sensor configured to detect a position value of an accelerator pedal; and
    a controller configured to calculate a virtual position value of the accelerator pedal limited to an increasing slope or a descending slope based on the position value of the accelerator pedal, and output a final torque of the driving motor by applying a vibration reduction torque gain based on the virtual position value of the accelerator pedal, wherein the controller is configured to calculate the virtual position value of the accelerator pedal using a high pass filter or a low pass filter.

2. The system of claim 1, wherein the controller is configured to output the final torque based on a maximum output torque of the driving motor and a vibration reduction torque to which applied the vibration reduction torque gain.

3. The system of claim 1, wherein the controller is configured to set the vibration reduction torque gain to a maximum value when the position value of the accelerator pedal is about 0%.

4. The system of claim 1, wherein the controller is configured to set the vibration reduction torque gain to a minimum value when the position value of the accelerator pedal is about 100%.

5. A method of controlling a motor for reducing vibration of an electric vehicle, comprising:
- detecting, by a controller, a position value of an accelerator pedal;
- calculating, by the controller, a virtual position value of the accelerator pedal limited to an increasing slope or a descending slope based on the position value of the accelerator pedal;
- applying, by the controller, a vibration reduction torque gain based on the virtual position value of the accelerator pedal; and
- outputting, by the controller, a final torque of a driving motor,
- wherein the virtual position value of the accelerator pedal is calculated using a high pass filter or a low pass filter.

6. The method of claim 5, wherein the final torque of the driving motor is calculated based on a maximum output torque of the driving motor and a vibration reduction torque to which applied the vibration reduction torque gain.

7. The method of claim 5, wherein the vibration reduction torque gain is set to a maximum value when the position value of the accelerator pedal is about 0%.

8. The method of claim 5, wherein the vibration reduction torque gain is set to a minimum value when the position value of the accelerator pedal is about 100%.

9. A non-transitory computer readable medium containing program instructions executed by a controller, the computer readable medium comprising:
- program instructions that control a driving motor to operate as a power source;
- program instructions that control an accelerator pedal position sensor to detect a position value of an accelerator pedal; and
- program instructions that calculate a virtual position value of the accelerator pedal limited to an increasing slope or a descending slope based on the position value of the accelerator pedal, and output a final torque of the driving motor by applying a vibration reduction torque gain based on the virtual position value of the accelerator pedal,
- wherein the virtual position value of the accelerator pedal is calculated using a high pass filter or a low pass filter.

10. The non-transitory computer readable medium of claim 9, wherein the final torque of the driving motor is calculated based on a maximum output torque of the driving motor and a vibration reduction torque to which applied the vibration reduction torque gain.

11. The non-transitory computer readable medium of claim 9, wherein the vibration reduction torque gain is set to a maximum value when the position value of the accelerator pedal is about 0%.

12. The non-transitory computer readable medium of claim 9, wherein the vibration reduction torque gain is set to a minimum value when the position value of the accelerator pedal is about 100%.

* * * * *